United States Patent [19]

McAfee

[11] 4,162,859
[45] Jul. 31, 1979

[54] VEHICLE STEERING KNUCKLE ARM ANGLE COMPENSATOR

[76] Inventor: Loyd O. McAfee, 4441 - 26th Ave. West, Seattle, Wash. 98199

[21] Appl. No.: 864,521

[22] Filed: Dec. 27, 1977

[51] Int. Cl.² .......................... F16C 11/00; F16D 1/12; F16D 3/00
[52] U.S. Cl. .................... 403/75; 280/95 R; 280/674; 403/77; 403/122; 403/DIG. 8
[58] Field of Search ............. 403/75, 76, 77, 62, 403/342, 343, 83, 84, 4; 280/674, 95 R

[56] References Cited

U.S. PATENT DOCUMENTS

| | | | |
|---|---|---|---|
| 1,646,288 | 10/1927 | Graham | 403/DIG. 8 |
| 1,940,466 | 12/1933 | Sneed | 403/75 |
| 2,217,560 | 10/1940 | Michon | 403/DIG. 8 |
| 2,771,300 | 11/1956 | Latzen | 403/77 X |
| 2,900,196 | 8/1959 | Nienke | 403/77 X |

Primary Examiner—Wayne L. Shedd
Attorney, Agent, or Firm—Robert W. Beach

[57] ABSTRACT

The outer ball joint end of a tie rod in a vehicle steering mechanism is connected to the frustoconical swivelably adjustable joint of a steering knuckle arm by an offset connector. Such connector positions the axis of the steering knuckle arm frustoconical joint offset from the diameter of the tie rod end ball joint which is parallel to such steering knuckel arm frustoconical joint axis. Swivel adjustment of the connector relative to the steering knuckle arm shifts orbitally such diameter of the tie rod ball joint relative to the axis of the steering knuckle arm frustoconical joint so as to alter the effective angle of the steering knuckle arm relative to the wheel spindle for appropriately varying the toe-out of the front vehicle wheels during turns to avoid or minimize sliding or skidding of the front wheel tires when the vehicle is turning.

15 Claims, 10 Drawing Figures

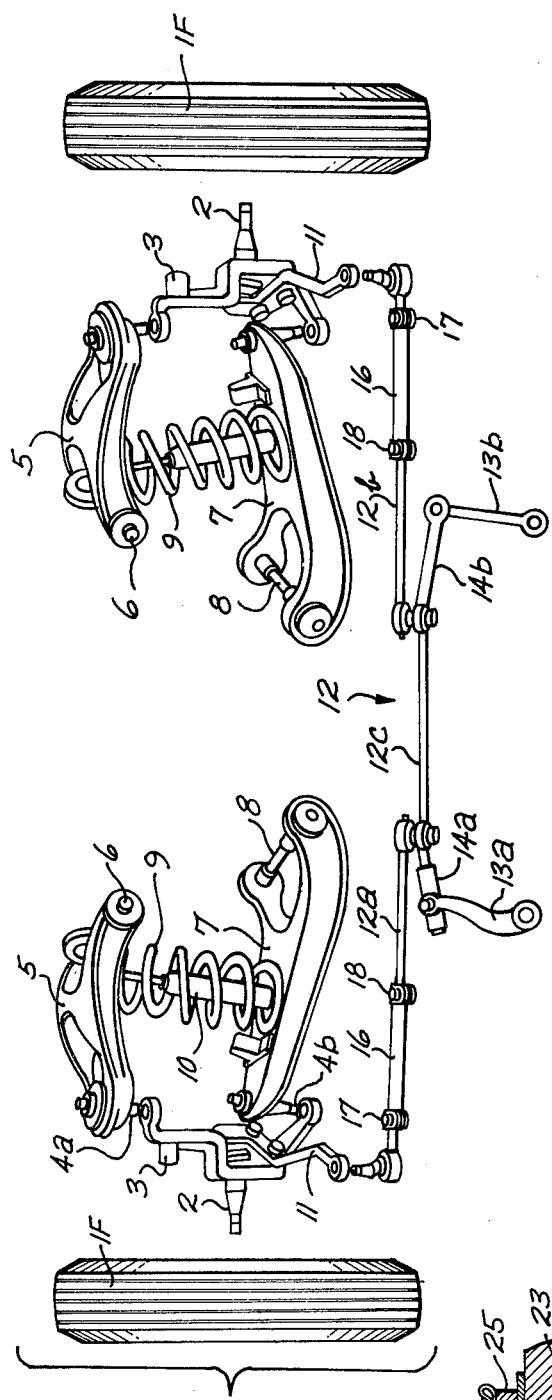
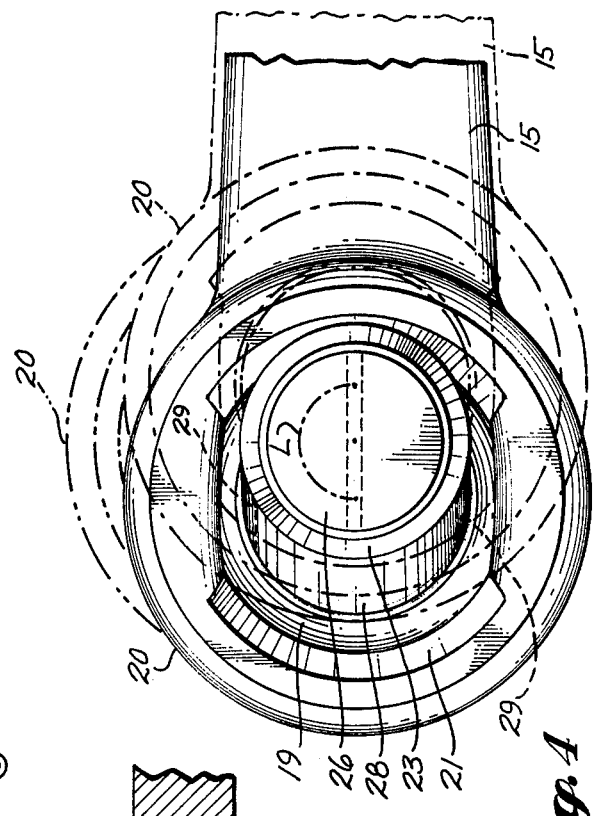
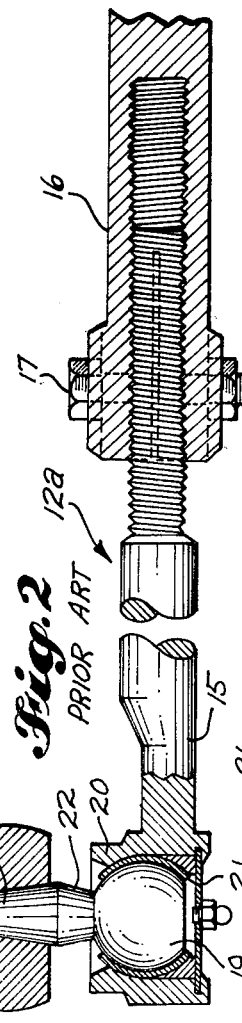
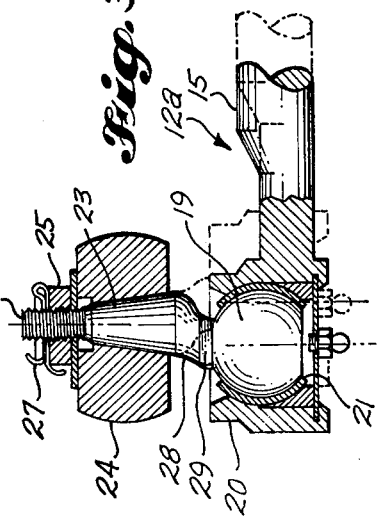

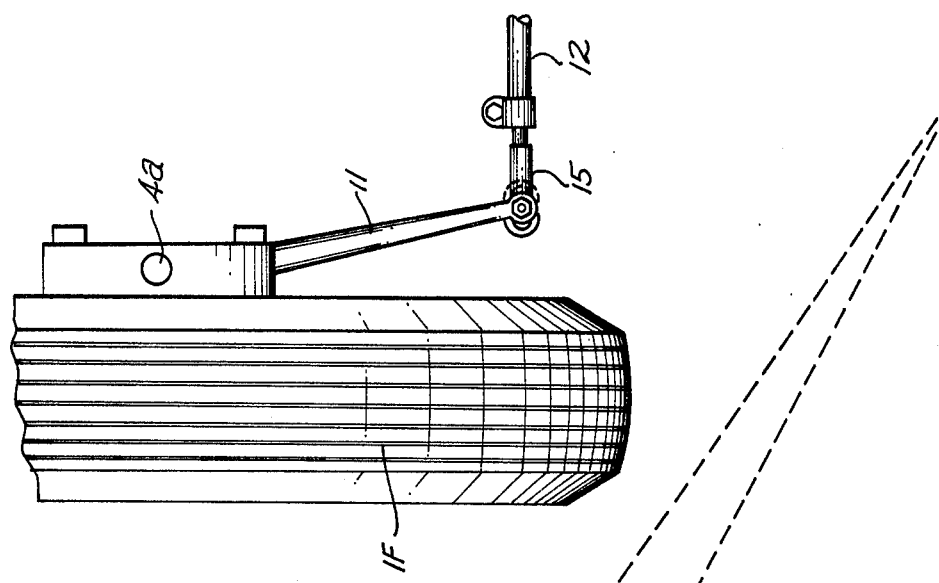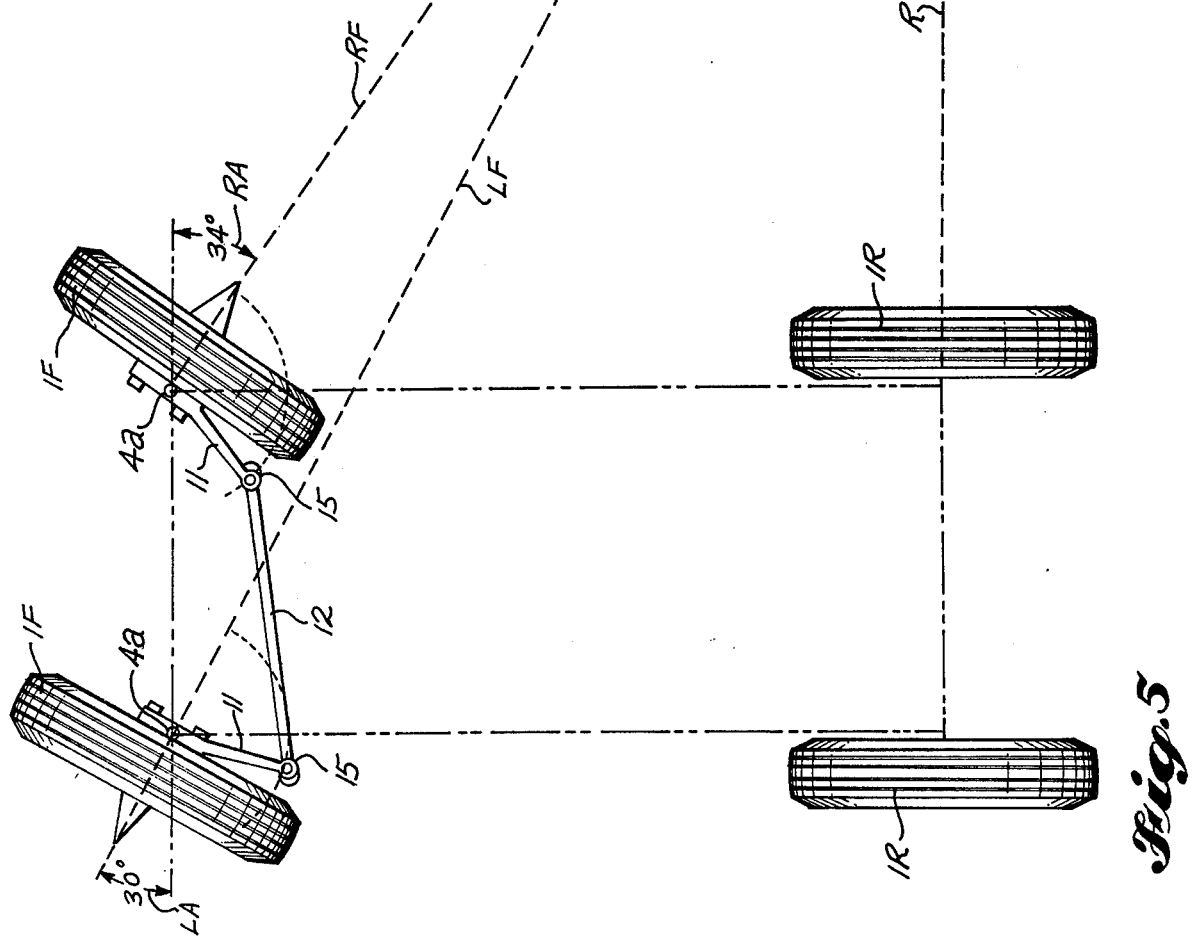

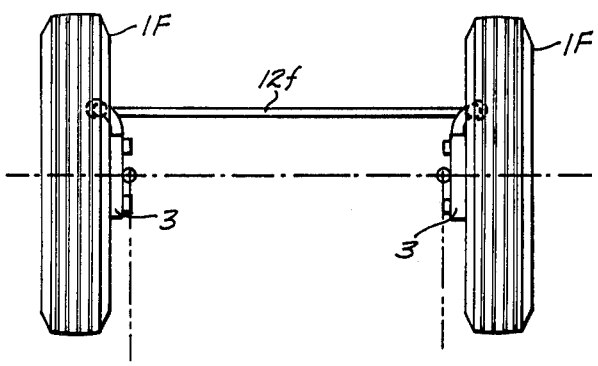
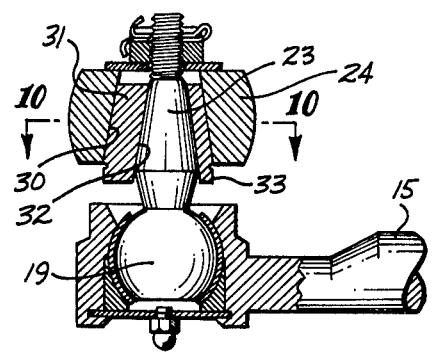
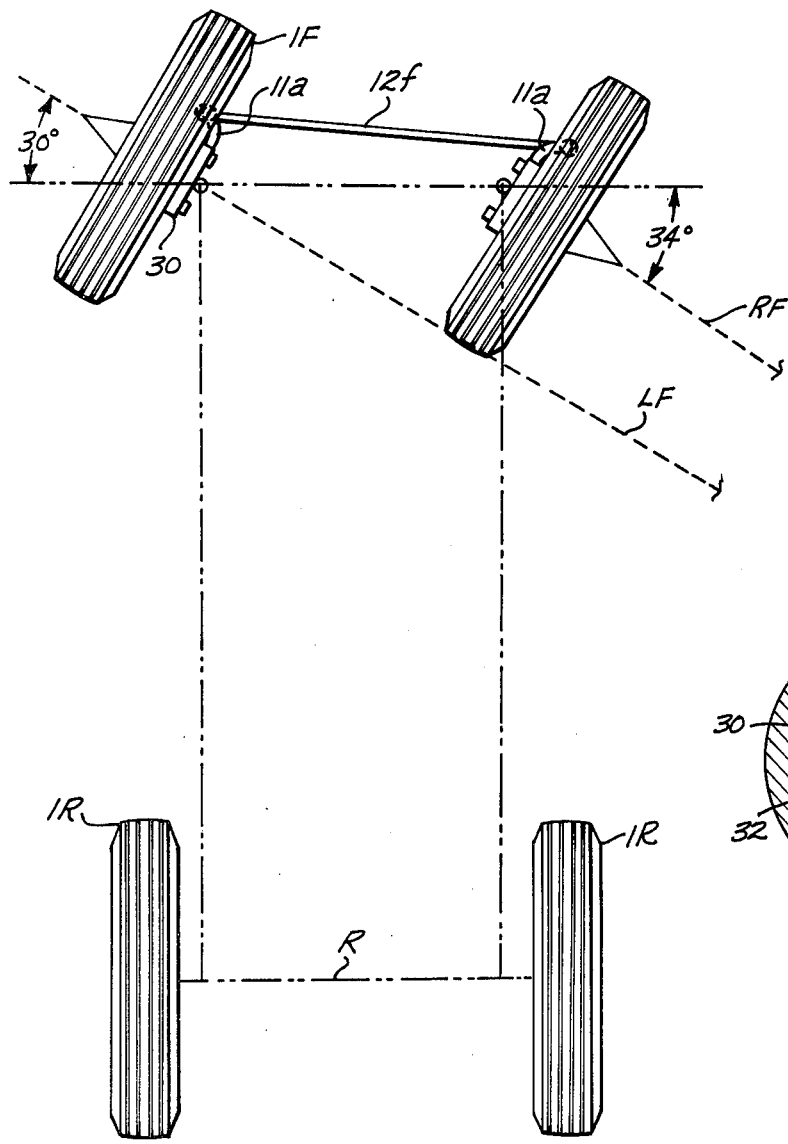
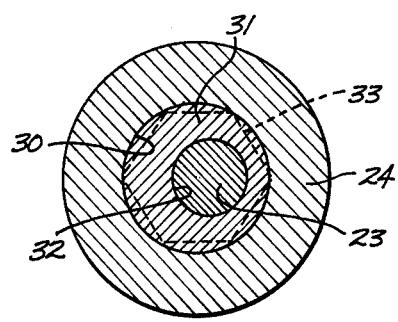

VEHICLE STEERING KNUCKLE ARM ANGLE COMPENSATOR

BACKGROUND OF THE INVENTION

1. Field of the Invention

The present invention relates to a vehicle steering mechanism, and more particularly to a compensator for such steering mechanism for altering the effective angle of a steering knuckle arm relative to its associated wheel spindle.

2. Prior Art

The angle of a steering knuckle arm relative to its associated wheel spindle in a vehicle steering mechanism has customarily been an obtuse angle so that when the vehicle is turning the toe-out of the front wheels is increased to maintain each of the wheel spindles substantially aligned with its turning radius to reduce sliding of the front wheels. Such Ackerman steering mechanism is described in the *McGraw-Hill Encyclopedia of Science and Technology* at volume 1, page 56. It has not been possible, however, to alter the effective angle between the steering knuckle arms and the wheel spindles to compensate for errors in design or inaccuracies in manufacture so as to eliminate, or at least minimize, such sliding without deformation of the steering knuckle arms by bending them to alter the steering knuckle arm angle. If the opposite steering knuckle arms are bent to correct an error in design or inaccuracy in manufacture of the arm, it is difficult to insure that each arm will be bent precisely the same amount. Therefore, by bending the steering knuckle arms to compensate for an error in design or inaccuracy in manufacture, it is possible that the symmetry of the steering linkage will be destroyed so that the vehicle will perform differently in turning to the left than in turning to the right.

SUMMARY OF THE INVENTION

It is an object of the present invention to enable the effective angle between a steering knuckle arm and its associated wheel spindle to be altered to minimize sliding of the steerable wheels of a vehicle when the vehicle is turning without deforming the steering knuckle arm by bending.

More specifically, it is an object to enable the steering mechanism to be altered so as to shift the location of the pivot axis between the steering knuckle arm and the associated tie rod relative to the wheel spindle without bending the steering knuckle arm.

An additional object is to enable adjustment of the steering knuckle arm angle in infinitely small increments.

A further object is to enable a steering mechanism to be adjusted so that it will operate properly during turning when a given type of steering knuckle arm is used in vehicles having different treads and/or different wheelbases.

It is also an object to enable a steering mechanism to be adjusted to provide proper operation so that fewer types of steering knuckle arms will be required for a greater variety of vehicle installations.

Another object is to provide a steering knuckle arm angle compensator that can be adjusted quickly, easily and accurately to provide the proper effective steering knuckle arm angle for different selected vehicle installations.

It is also an object to provide such a steering knuckle arm angle compensator which is inexpensive, of rugged construction and is not subject to any greater wear than the corresponding component of conventional steering mechanisms.

The foregoing objects can be accomplished by providing an offset connector or an eccentric connector between the steering knuckle arm and the tie rod, which connector can be adjusted relative to the steering knuckle arm to alter the location of the pivot axis of the ball joint connecting the steering knuckle arm and the tie rod relative to the wheel spindle for changing the effective angle between the steering knuckle arm and the wheel spindle without bending of the steering knuckle arm being required.

BRIEF DESCRIPTION OF THE DRAWINGS

FIG. 1 is a somewhat diagrammatic partially exploded top perspective of components of a vehicle steering mechanism and wheel suspension.

FIG. 2 is a side elevation of the connection between a tie rod end and a steering knuckle arm end with parts broken away showing conventional structure; and FIG. 3 is a similar view of such a connection incorporating the compensating connector of the present invention.

FIG. 4 is a fragmentary plan of the end portion of a tie rod carrying the compensating connector of the present invention.

FIG. 5 is a diagrammatic plan of a vehicle steering system in which the tie rod is located rearwardly of the wheel turning axes illustrating the action of the steering mechanism on the vehicle front wheels during turning of the vehicle.

FIG. 6 is a plan of a steering knuckle indicating the alteration in extreme positions of the pivot axis between a steering knuckle arm and its associated tie rod end which can be effected by utilization of the compensator of the present invention.

FIG. 7 is a diagrammatic plan of a vehicle steering system in which the tie rod is located forward of the wheel turning axes, the wheels being shown positioned for travel of the vehicle along a straight course.

FIG. 8 is a similar diagrammatic plan illustrating the action of the steering mechanism on the vehicle front wheels during turning of the vehicle.

FIG. 9 is a side elevation of the connection between a tie rod and a steering knuckle arm end with parts broken away showing a modified type of connection in accordance with the present invention, and FIG. 10 is a horizontal section through the connection of FIG. 9 taken on line 10—10 of that figure.

DETAILED DESCRIPTION

The construction of vehicle steering mechanism varies from one make of vehicle to another and may vary among different lines of vehicles of a particular manufacturer or even among different models of a given line. The principle of the steering knuckle arm angle compensator of the present invention can be adapted readily to most types of vehicle steering mechanism construction. For the purpose of illustrating the structure and operation of the present invention, a representative type of steering mechanism and wheel suspension shown in FIG. 1, which are conventional in the majority of automobiles made in the United States except for the compensators of the present invention. Moreover, components of such steering mechanism have been shown in exploded relationship so that the form and general correlation of the parts can be recognized more easily.

The typical steering mechanism of FIG. 1 connects front wheels 1F mounted on wheel spindles 2 carried by and projecting outward from wheel spindle supports 3. Such supports are mounted for forward and rearward swinging of the wheel spindles by an upper kingpin or steering pivot component 4a and a lower kingpin or steering pivot component 4b. The upper kingpin component is carried by the swinging end of an upper control or suspension arm 5 swingably mounted by a shaft 6. The lower kingpin component 4b is carried by the swinging end of a lower control or suspension arm 7 swingably mounted by a shaft 8.

A helical coil suspension spring 9 and a shock absorber 10 extending axially through such spring are engaged between the lower control arm 7 and the vehicle frame. As the control arms are swung upward conjointly by an upward force applied to the wheel 1F, the spring and shock absorber will be compressed to cushion and absorb road shocks.

Fore-and-aft swinging of spindles 2 and consequent change in angle of wheels 1F relative to the longitudinal axis of the vehicle is accomplished and controlled by applying forces transversely of the vehicle to the ends of the steering knuckle arms 11 remote from the spindles 2. For purposes of illustration, FIG. 5 shows the steering knuckle arms as projecting rearward from the wheel spindle supports 3, but such arms could project forward from the spindle supports as shown in FIGS. 7 and 8. Forces applied simultaneously to the two steering knuckle arms by a tie rod 12 connecting them as shown in FIG. 5 effects conjoint controlled swinging of the steering knuckle arms and, consequently, of the wheel spindles.

The steering knuckle arms 11 can be formed integral with the spindle supports 3, as indicated in FIG. 5, or, as shown in FIG. 1, can be secured rigidly to the wheel spindle supports such as by bolts. In either case, the steering knuckle arm and the associated wheel spindle form components of a rigid unit that is swingable about the axis of the kingpin components or steering axes 4a and 4b as the wheel spindle swings forward and rearward.

In FIG. 1 tie rod 12 is shown as being of sectional construction including the left tie rod section 12a connected to the left steering knuckle arm 11 and the right tie rod section 12b connected to the right steering knuckle arm 11. The adjacent ends of the tie rod sections 12a and 12b are connected by ball joint connectors to the intermediate arm or drag link 12c.

Lengthwise shifting of tie rod 12 transversely of the vehicle for effecting steering is accomplished by swinging the steering gear lever or pitman arm 13a which is pivotally connected to the left end portion 14a of drag link 12c. To support such drag link and the inner end of the right tie rod section 12b attached to it, an idler arm 13b is connected to the right end portion 14b of the drag link. The rearward end of such idler arm is connected to the vehicle by a fixed pivot. The length of the idler arm is equal to the length of steering gear lever 13a so that as such lever is swung it always will be substantially parallel to the idler arm, resulting in parallel motion of the drag link 12c.

When the vehicle is at rest, it is desirable for the vehicle front wheels 1F to toe-in precisely to such an extent that when the vehicle is traveling forward the forces exerted on the wheels will take up the play between the parts of the steering linkage, including the ball joint connectors between the tie rod ends 15 and the steering knuckle arms 11, and maintain the wheels parallel. The proper amount of wheel toe-in can be set in accordance with experience by altering the lengths of the outer tie rod sections 12a and 12b by turning turnbuckle sleeves 16. Such length adjustment is effected by setting the length of each tie rod section 12a and 12b independently while the steering gear lever 13a is positioned for straight ahead movement of the vehicle. However, the lengths of the tie rod sections 12a and 12b should be equal when adjusted so that the toe-in will be equalized between the two wheels. The turnbuckle sleeves can then be secured to the parts of the tie rod fitted within it by tightening clamps 17 and 18 at opposite ends of the turnbuckle sleeve so that the tie rod becomes a rigid member of fixed length.

The change in relationship between the steering knuckle arms 11 and tie rod 12 during turning of the vehicle is illustrated in FIG. 5. This figure shows the positions assumed by the components of the steering gear during a right turn. If the transverse spacing between the pivot axes through ball joints 19 were the same as the transverse spacing between the axes of the kingpins 4a, 4b, the angle of forward swing of one wheel spindle 2 would be equal to the angle of rearward swing of the other wheel spindle so that wheels 1F at opposite sides of the vehicle would remain parallel. Such relationship is undesirable, however, because such positioning of the wheels would cause one or the other or both of the wheels to slide to a greater or lesser extent depending upon the tread and wheelbase of the vehicle and the degree of turn.

FIG. 5 illustrates the geometry which occurs during turning of a vehicle where the tie rod is located rearwardly of the vehicle wheel turning axes. A transverse line R through the centers of the rear vehicle wheels 1R will pass through the center of turn of the vehicle. In order to avoid sliding or skidding of either front wheel 1F, the plane of each wheel must be perpendicular to the radius of turn of that wheel for all degrees of turn. Stated in another way, the spindle 2 of each wheel must always be aligned with the radius of turn to avoid such sliding or skidding. In an illustrative turn, the turning radius of the left front wheel is designated LF in FIG. 5 and the turning radius of the right front wheel is designated RF.

It will be seen from the diagram in FIG. 5 that the vehicle wheel on the inside of the turn always leads the vehicle wheel on the outside of the turn. The turning angle RA of the inside wheel in the turn will always be greater than the turning angle LA of the outside wheel in the turn. To prevent skidding each wheel should always be perpendicular to its turning radius. In other words, the front wheels should always toe out during any substantial turn and the amount of toe-out should increase as the radius of turn decreases. In the representative example shown in FIG. 5, the turning angle RA for the inside wheel is 34 degrees, whereas the turning angle LA for the outside wheel is only 30 degrees. The steering linkage must be designed to effect unequal swinging of the spindles 2 about the kingpin axes 4a, 4b so as to accomplish such differential turning angles of the front wheels.

Turning of the wheels through such differential angles is accomplished by designing knuckle arms 11 with reference to spindle supports 3 so that each knuckle arm is at an obtuse angle to a spindle 2 in steering systems where the tie rod is located behind the wheel turning axes. Consequently, though the swinging ends of the knuckle arms are shifted equal distances laterally of the vehicle by lengthwise shifting of the tie rod 12, the lateral shifting of one steering knuckle arm end effects a greater degree of swinging of its respective spindle than does the lateral shifting of the other steering knuckle arm end. The degree of the angle between each steering knuckle arm and its spindle will determine the amount of differential swing of the wheel spindles when the vehicle is turning.

The knuckle arms are intended to be designed to provide the proper differential between the turning angles of the inside wheel and the outside wheel, but a steering knuckle assembly cannot be designed to be appropriate for all types of vehicles. It can be seen from FIG. 5 that, for a particular degree of turn, the turning angle for both wheels must be greater if the wheelbase is longer and the differential between the turning angle LA of the left wheel and the turning angle RA of the right wheel will be decreased. For vehicles having a wider tread, the differential between the outside wheel turn angle LA and the inside wheel turn angle RA will be greater for a given wheel base and degree of vehicle turn.

It is not a simple matter to design a steering knuckle arm or steering knuckle arm mounting to provide the proper turn angle and turn angle differential for various vehicle turns, and, as pointed out above, the required steering angle differential varies with different types of vehicles. Also, inaccuracies can occur in the manufacture of steering knuckle arms so that they depart from the intended design. When the angle between steering knuckle arm 11 and spindle 2 has been incorrect in the past a correction has been possible only by bending the steering knuckle arm. Such an operation is not precise because of the springback in the arm being bent, and such operation requires special equipment. Alternatively the steering knuckle arms could be replaced with different, proper arms, but such arms may not be available. The present invention provides a compensator for an improper angle between a steering knuckle arm and a spindle which can be adjusted to alter the effective angle of the steering knuckle arm by infinitely small increments without requiring bending of such arm or replacement of the arm. The desired correction of an improper steering knuckle armm angle can be effected by replacing the conventional connector connecting the tie rod end and the steering knuckle arm with a connector provided by the present invention.

The conventional type of pivot connection between an outer tie rod end 15 and the swinging end of a steering knuckle arm 11 is shown in FIG. 2 for comparison with the corresponding structure of the present invention. Such connection includes a ball joint formed by a ball 19 complemental to and fitted within a socket 20 formed on the outer end 15 of the tie rod. Wear of the ball or socket can be reduced and friction can be decreased by providing a liner 21 fitted between the ball and the socket. A shank 22 of the connector projecting radially upward from ball 19 includes a frustoconical joint portion 23 complemental to and fitted within a tapered socket in the steering knuckle arm swinging end 24. A nut 25 screwed onto the threaded end portion 26 of shank 22 pulls the shank frustoconical joint portion into the socket and makes a tight connection. The nut can be secured in place by a cotter pin 27 so that shank 22 and steering knuckle arm end 24 form a rigid unit.

As the steering gear lever 13a is swung to shift tie rod 12 lengthwise transversely of the vehicle, thrust is exerted by the tie rod on the swinging ends of the steering knuckle arms to swing such arms about their respective kingpin axes. Consequently, the angle between each steering knuckle arm and the tie rod 12 will vary as indicated in FIG. 5. As shown in FIG. 2, the frustoconical joint portion 23 of shank 22 is rigidly fixed to the end of the steering knuckle arm 24, and the axis of the ball joint 19, 20 pivot between the steering knuckle arm and the tie rod is aligned with the axis of such frustoconical joint.

The preferred connector of the present invention includes a spherical ball joint component, such as ball 19, and a shank component projecting generally radially from the ball. The shank includes the frustoconical joint portion 23 and an offset 28. As shown in FIG. 3, the offset effects an offset relationship between the axis of the frustoconical joint portion 23 and the diameter of the spherical ball joint which is parallel to the axis of the frustoconical joint. An offset between such axis and diameter of ⅜ inch will enable the differential between the inside wheel turn angle RA and the outside turn angle LA to be varied approximately 3 degrees when the turn angle LA of the outside wheel is 20 degrees.

The compensator of the present invention enables the pivot axis between the tie rod end 15 and the steering knuckle arm end 24 to be shifted to any position between the solid line position shown in FIGS. 3 and 4 and the broken line position of those figures along the locus L of FIG. 4 and to be fixed in that position. Such adjustment is effected by turning the frustoconical joint portion 23 of the compensator shank relative to the swinging end of knuckle arm 24. Such turning can be effected easily when nut 25 is loosened by providing flat surfaces 29 on opposite sides of the compensator shank offset adjacent to the ball joint component to form a wrench shank that can be engaged by an open end wrench, or by providing a screwdriver cross slot in the end 26 of the shank. The compensator can then be turned about the axis of the frustoconical joint portion 23 to move the ball joint component diameter which is parallel to such axis in orbital fashion along the semicircular locus L shown in FIG. 4. Such locus is concentric with the frustoconical joint portion axis. During the swiveling adjustment of the frustoconical joint portion 23, the offset 28 of the compensator shank functions as a crank to move the steering knuckle arm end 24 transversely of the vehicle to the same extent as the ball joint diameter pivot axis is moved along the semicircular locus L shown in FIG. 4, because such ball joint diameter is held stationary transversely of the vehicle.

If the toe-in of a wheel is adjusted to the value desired by rotating a turnbuckle sleeve 16 while the pivot axis of the connector is located at the center of the arcuate locus L shown in FIG. 4, the steering mechanism can be tested on a wheel-aligning machine at a turn angle LA for the outside wheel of 20 degrees, for example. If the differential between the wheel angle LA on the outside of the turn and the wheel angle RA on the inside of the turn is too great, such wheel angle differential can be reduced by turning the compensator of the left wheel counterclockwise as seen in FIG. 4, to shift the pivot axis to the left along the locus arc L which corresponds to an effective decrease in the angle between the steering knuckle arm and the wheel spindle. Such swiveling of the compensator will swing the rearwardly projecting steering knuckle arm counterclockwise which swings the wheel spindle rearward, thus decreasing the toe-in of the wheel. It will then be necessary to turn the turnbuckle sleeve 16 when unclamped for lengthening tie rod section 12a, thereby swinging the steering knuckle arm and wheel spindle clockwise to restore the desired degree of toe-in. The result of such operation is to shift the axis of the ball joint 19,20 outboard.

Alternatively, if the test of the steering mechanism at an assumed turning angle for the outside wheel of 20 degrees shows that the differential between the outside wheel turning angle LA and inside wheel turning angle RA is too small, such turning angle differential can be increased by swiveling the offset compensator from the centered position of the pivot axis on the locus L in the clockwise direction as seen in FIG. 4. Such swiveling adjustment of the frustoconical joint portion 23 will correspond to an increase in steering knuckle arm angle. The crank action of the compensator occurring during such swiveling adjustment of the frustoconical joint portion will swing the steering knuckle arm 11 in the clockwise direction as seen in FIG. 5, which will increase the amount of toe-in. After the frustoconical joint portion 23 has been secured in its desired adjusted position in the steering knuckle arm 24, it will then be necessary to turn the turnbuckle sleeve 16 in the direction for shortening the tie rod so that the desired degree of toe-in will be restored. The result of such operation is to shift the axis of the ball joint 19,20 inboard.

As has been mentioned above, the important consideration in altering the effective angle between the steering knuckle arm and the wheel spindle is the shifting of the pivot axis between the steering knuckle arm end 24 and the tie rod end 15 in a direction principally transversely of the vehicle and lengthwise of the tie rod. As described above, if the tie rod is located rearwardly of the wheel steering axes increasing the length of the tie rod for a given degree of toe-in in conjunction with swiveling the compensator reduces the effective steering knuckle arm angle and correspondingly reduces the differential between the turning angles of the outside and inside wheels. Conversely, shortening the tie rod to maintain a given amount of toe-in in conjunction with swiveling the compensator oppositely will increase the effective steering knuckle arm angle and correspondingly increase the differential between the turning angles of the outside wheel and the inside wheel.

After the required adjustment has been made, nut 25 will be tightened to fix the frustoconical joint portion 23 in its socket and thus unite such frustoconical shank portion with the steering knuckle arm end 24 for operational purposes. Further, turnbuckle 16 can be locked in place in a conventional manner.

FIGS. 7 and 8 show a steering system in which the tie rod is located forwardly of the wheel steering axes instead of rearwardly as shown in FIG. 5. In this type of system when the wheels 1F are in the straight ahead position as shown in FIG. 7, the steering arms 11a extend forward from the spindle mounts 3 to the tie rod 12f. In this instance, the steering knuckle arms 11a are shorter than the steering knuckle arms 11 shown in FIG. 5, and the effective angles between such arms and the angles of spindles 2 are acute instead of being obtuse. Again, the degree of toe-out which occurs in turns, that is, the differential between the turning angle of the outside wheel and the inside wheel, can be altered by varying the positions of the axes of the pivot connections between the tie rod 12f and the forwardly projecting steering knuckle arms.

If the effective pivot axes of the joints between the tie rod and the steering knuckle arms are moved inward, the degree of toe-out and differential between the turn angles of the outside wheel of the turn and the inside wheel of the turn as seen in FIG. 8 will be decreased. Conversely, if the axes of the joints between the steering knuckle arms and the tie rod are moved outward, the toe-out of the wheels and the differential between the turn angle of the outside wheel and the turn angle of the inside wheel will increase correspondingly. The same type of offset axis adjusting compensator can be used for connecting the forwardly projecting steering knuckle arms 11a to the opposite end portions of the tie rod 11f and can be used for enabling adjustment of the positions of such axes as described in connection with FIGS. 3, 4 and 6.

While the offset shank of the compensator of the present invention described above is attached to the spherical ball component of a ball joint as shown in FIG. 3, alternatively it could be attached to the spherical socket component of such a ball joint. In either case the shank projects generally radially from the ball component of the ball joint. Moreover, while the shank of the compensator could carry a frustoconical socket to be fitted with a shank carried by the steering knuckle arm end, or some other type of rigidifiable joint could be used, it is preferred that the connector shank have a frustoconical shank joint portion as shown in FIG. 3. By providing structure of the type shown in FIG. 3, it will be evident by a comparison of such structure with the conventional structure shown in FIG. 2 that a tie rod end fitted with the offset shank compensator of the present invention could simply be substituted for the corresponding conventional tie rod end structure shown in FIG. 2 without any other modification of the steering mechanism being made. Consequently, utilization of the present invention is very easy and economical.

In FIGS. 9 and 10 an alternative type of structure in accordance with the present invention is shown which can be adjusted to shift the location of the pivot axis between a tie rod end and an end of a steering knuckle arm. In this structure, the steering knuckle arm end 24 has a larger concentric frustoconical bore 30 extending through it. This bore is complemental to the frustoconical periphery of a compensator sleeve 31. Such sleeve has a frustoconical bore 32 extending through it which is located eccentrically of the periphery of such sleeve. The bore 32 is complemental to the frustoconical tapered joint portion 23 of a connector shank shown in FIG. 2. The axis of such shank is aligned with a diameter of the ball and socket joint 19, 20.

A wrench shank 33 in the form of a hexagon or octagon is formed on the larger end of the compensator sleeve 31 to enable such sleeve to be turned easily by an end wrench relative to the steering knuckle arm end 24 in order to alter the position of the axis of the joint component 23 relative to the steering knuckle arm and the wheel spindle 2.

The procedure for adjusting the position of the pivot axis between the tie rod end and the end of the steering knuckle arm using the structure shown in FIGS. 9 and 10 is the same as that described in locating the pivot axis by utilizing the offset compensator shown in FIGS. 3, 4 and 6. If the steering knuckle arms project rearwardly from the spindle mount, rotating the eccentric sleeve 31 to shift the left steering knuckle arm end outward will swing such arm and the wheel spindle clockwise as seen in plan, increasing the amount of toe-in. If the tie rod is then shortened to restore the proper degree of toe-in, the effective pivot axis between the tie rod and the steering knuckle arm end will be moved inboard to increase the effective steering knuckle arm angle and increase the differential of the turning angle between the outside wheel and the inside wheel.

Conversely, turning eccentric sleeve 31 to shift the left steering knuckle arm end 24 inboard relative to the ball joint 19,20 will swing such arm and the wheel spindle counterclockwise and increase the amount of toe-in. If the tie rod is then lengthened to restore the proper amount of toe-in the effective steering knuckle arm angle will be decreased and the differential of the turning angle between the outside wheel and the inside wheel will be reduced.

I claim:

1. Vehicle steering knuckle arm angle compensator means comprising a tie rod adjustable in effective length and having a spherical ball joint component, and a connector including a spherical ball joint component complemental to and fitted with said tie rod ball joint component and a shank projecting generally radially from said connector ball joint component, said shank having a joint portion spaced from said connector ball joint component for attachment to a steering knuckle arm and swivelably adjustable relative thereto as said ball joint components are relatively swivelably adjusted and said shank further having an offset rigidly connecting said connector ball joint component and said joint portion.

2. The compensator means defined in claim 1, in which the joint portion of the shank has an axis about which such joint portion is swivelably adjustable relative to the steering knuckle arm, and such axis is offset from the diameter of the connector spherical ball joint component which is parallel to such joint portion axis.

3. The compensator means defined in claim 1, the tie rod having an end portion carrying the tie rod spherical ball joint component and an inner tie rod portion longitudinally adjustable relative to said tie rod end portion.

4. The compensator means defined in claim 1, in which the joint shank portion is frustoconical, and the axis of said frustoconical joint portion is offset from the diameter of the connector spherical ball joint component which is parallel to the axis of said frustoconical joint portion.

5. The compensator means defined in claim 1, in which the connector spherical ball joint component is a ball and the tie rod spherical ball joint component is a socket complemental to and receiving said ball for forming the ball joint.

6. In vehicle steering mechanism, a tie rod adjustable in effective length and having an end portion including a ball joint, a steering knuckle arm having a joint portion, and a rigid connector connecting said tie rod end portion ball joint and said steering knuckle arm joint portion, being swivelably adjustable relative to said steering knuckle arm joint portion and relative to said tie rod end portion and including an offset between said ball joint and said steering knuckle arm joint portion.

7. In the steering mechanism defined in claim 6, the steering knuckle arm joint portion being frustoconical, and the connector including a frustoconical joint portion complemental to said frustoconical steering knuckle arm joint portion, fitted therewith and swivelably adjustable relative thereto.

8. In the steering mechanism defined in claim 7, the axis of the interfitted steering knuckle arm joint portion and the connector joint portion being offset from the diameter of the ball joint parallel to the axis of said interfitted frustoconical joint portions.

9. In vehicle steering mechanism, a tie rod adjustable in effective length and having an end portion including a spherical ball joint component, a steering knuckle arm having a joint component, and a rigid connector connecting said tie rod end portion and said steering knuckle arm and including a spherical ball joint component complemental to and fitted with said tie rod end portion ball joint component and a shank projecting generally radially from said connector ball joint component complemental to and fitted with said steering knuckle arm joint component and rotatively adjustable relative thereto about an axis, the portion of said shank between said connector ball joint component and said further joint component being offset to dispose such axis offset from the diameter of the ball joint components parallel to such axis.

10. In the steering mechanism defined in claim 9, the tie rod end portion spherical ball joint component being a socket, and the connector spherical ball joint component being a ball complemental to and fitted in said socket.

11. In the steering mechanism defined in claim 9, the steering knuckle arm joint component being a frustoconical socket and the connector shank further joint component being a frustoconical shank portion fitted in said steering knuckle arm frustoconical socket.

12. In a vehicle steering gear connector for connecting a tie rod and a steering knuckle arm for relative swinging about an axis, such connector including first means for attaching the connector to the tie rod, second means for attaching the connector to the knuckle arm and means for connecting the first and second means, the improvement comprising the connecting means and the tie rod including means for shifting the swinging axis relative to the steering knuckle arm without altering the final toe condition of the steering knuckle arm.

13. In the steering mechanism defined in claim 12, the connecting means including an eccentric sleeve located between the first means and the second means, and means for adjusting the effective length of the tie rod.

14. In a method of adjusting vehicle steering linkage having a steering knuckle arm and a tie rod pivotally connected for relative swinging about a pivot axis, the improvement which comprises the step of changing the position of the pivot axis relative to the steering knuckle arm without altering the final toe condition of the steering knuckle arm and thereby changing the effective angle between the steering knuckle arm and the wheel spindle.

15. In the method defined in claim 14, the improvement further comprising adjusting relative to the steering knuckle arm a connector connecting the steering knuckle arm and the tie rod and thereby altering the degree of toe of a wheel carried by the steering knuckle arm, and thereafter adjusting the length of the tie rod without altering the relationship of the connector and the steering knuckle arm for restoring the degree of wheel toe that existed prior to adjusting the connector relative to the steering knuckle arm.

* * * * *

UNITED STATES PATENT AND TRADEMARK OFFICE
CERTIFICATE OF CORRECTION

PATENT NO. : 4,162,859
DATED : July 31, 1979
INVENTOR(S) : Loyd O. McAfee

It is certified that error appears in the above—identified patent and that said Letters Patent are hereby corrected as shown below:

Column 9, line 44, cancel "joint shank" and insert
--shank joint--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks